(12) United States Patent
Tuomi et al.

(10) Patent No.: US 7,395,050 B2
(45) Date of Patent: Jul. 1, 2008

(54) METHOD AND SYSTEM FOR AUTHENTICATING USER OF DATA TRANSFER DEVICE

(75) Inventors: Jukka Tuomi, Tampere (FI); Henry Haverinen, Jyväskylä (FI); Niklas Lybäck, Espoo (FI); Sami Pienimäki, Pirkkala (FI)

(73) Assignee: Nokia Corporation, Espoo (FI)

( * ) Notice: Subject to any disclaimer, the term of this patent is extended or adjusted under 35 U.S.C. 154(b) by 261 days.

(21) Appl. No.: 10/511,105

(22) PCT Filed: Dec. 17, 2002

(86) PCT No.: PCT/FI02/01033

§ 371 (c)(1),
(2), (4) Date: Oct. 14, 2004

(87) PCT Pub. No.: WO03/088577

PCT Pub. Date: Oct. 23, 2003

(65) Prior Publication Data

US 2005/0176407 A1    Aug. 11, 2005

(30) Foreign Application Priority Data

Apr. 16, 2002    (FI) .................................. 20020733

(51) Int. Cl.
*H04M 1/66* (2006.01)
(52) U.S. Cl. ..................... 455/411; 455/410; 455/432.1; 455/432.2; 455/433; 455/550.1; 455/552.1; 455/553.1; 380/247; 380/248; 380/249; 380/250; 380/270; 713/171

(58) Field of Classification Search ................. 455/410, 455/411, 432.1, 432.2, 432.3, 433, 550.1, 455/552.2, 553.1, 551, 41.2; 380/247, 248, 380/249, 250, 270, 277; 713/171
See application file for complete search history.

(56) References Cited

U.S. PATENT DOCUMENTS 5,537,457 A * 7/1996 Lantto et al. ................. 455/433
5,828,956 A * 10/1998 Shirai .......................... 455/411
6,112,078 A    8/2000 Sormunen et al.

(Continued)

FOREIGN PATENT DOCUMENTS

EP    1 107 089 A1    6/2001

(Continued)

*Primary Examiner*—Rafael Perez-Gutierrez
*Assistant Examiner*—Olumide Ajibade-Akonai
(74) *Attorney, Agent, or Firm*—Squire, Sanders & Dempsey, L.L.P.

(57) ABSTRACT

The invention relates to a method and system for authenticating a user of a data transfer device (such as a terminal in a wireless local area network, i.e. WLAN). The method comprises: setting up a data transfer connection from the data transfer device to a service access point. Next, identification data of the mobile subscriber (for example an MSISDN) are inputted to the service access point. This is followed by checking from the mobile communications system whether the mobile subscriber identification data contains an access right to the service access point. If a valid access right exists, a password is generated, then transmitted to a subscriber terminal (for example a GSM mobile phone) corresponding to the mobile subscriber identification data, and login from the data transfer device to the service access point takes place with the password transmitted to the subscriber terminal.

40 Claims, 2 Drawing Sheets

U.S. PATENT DOCUMENTS

| | | | |
|---|---|---|---|
| 6,134,431 A * | 10/2000 | Matsumoto et al. | 455/411 |
| 6,463,286 B1 * | 10/2002 | Salminen | 455/453 |
| 6,526,034 B1 * | 2/2003 | Gorsuch | 370/338 |
| 7,065,067 B2 * | 6/2006 | Song et al. | 370/338 |

FOREIGN PATENT DOCUMENTS

| | | | |
|---|---|---|---|
| EP | 1 191 763 A2 | 3/2002 | |
| WO | WO 95/19593 | 7/1995 | |
| WO | WO 01/67716 | 9/2001 | |
| WO | WO 01/99382 | 12/2001 | |
| WO | WO 02/19593 | 3/2002 | |
| WO | WO 02/21464 | 3/2002 | |

\* cited by examiner

METHOD AND SYSTEM FOR AUTHENTICATING USER OF DATA TRANSFER DEVICE

FIELD

The invention relates to a method for authenticating a user of a data transfer device and to a system for authenticating a user of a data transfer device.

BACKGROUND

Prior art knows different methods for authenticating users of data transfer devices. One authentication method is based on the use of a SIM card (Subscriber Identity Module) placed in the data transfer device, the method requiring, however, a smart card reader in the data transfer device. Moreover, the solution is not easy to apply in situations where a data transfer service is to be used temporarily, maybe only once, on the data transfer service, because for that purpose a SIM card would have to be delivered to the data transfer device of the user.

U.S. Pat. No. 6,112,078, which is incorporated herein as a reference, discloses a solution which does not include a SIM card and in which at least some of the authentication data are transmitted to a mobile station or a paging device which the user of the data transfer device has at his/her disposal. For reasons of data security, all the authentication data, for example the user ID and the password, are not sent over the same the transmission path.

BRIEF DESCRIPTION

It is an object of the invention to provide an improved method for authenticating a user of a data transfer device and an improved system for authenticating a user of a data transfer device.

One aspect of the invention is a method for authenticating a user of a data transfer device, comprising: setting up a data transfer connection from the data transfer device to a service access point; inputting identification data of a subscriber of a mobile communications system to the service access point; checking from the mobile communications system whether the mobile subscriber identification data contains an access right to the service access point; and, if a valid access right exists, generating a password, transmitting the password to a subscriber terminal corresponding to the mobile subscriber identification data, and logging in to the service access point from the data transfer device using the password transmitted to the subscriber terminal.

Another aspect of the invention is a system for authenticating a user of a data transfer device, comprising: a data transfer device, a service access point that can be linked to the data transfer device over a first data transfer connection, and an authentication server linked to the service access point over a second data transfer connection; the service access point is configured to receive over the first data transmission connection identification data of a subscriber of a mobile communications system inputted from the data transfer device and to transmit the mobile subscriber identification data to the authentication server over the second data transfer connection; the authentication server is configured to check from the mobile communications system over a third data transfer connection whether the mobile subscriber identification data contains an access right to the service access point, and, if a valid access right exists, to generate a password and transmit the password to a subscriber terminal corresponding to the identification data of the subscriber of the mobile communications system; and the data transfer device is configured to use the password transmitted to the subscriber terminal in connection with login to the service access point.

The invention is based on the idea that a data transfer device user is authenticated utilizing the identification data of a subscriber of a mobile communications system. A password, at least, is transmitted to a subscriber terminal corresponding to the mobile subscriber identification data. The mobile subscriber identification data shows that an access right to a desired service access point is provided.

The method and system of the invention provide a number of advantages. The authentication of the data transfer device user does not require any additional equipment or software to be used in the data transfer device, but only access to a subscriber terminal, either through ownership or by borrowing, in a mobile communications system. The solution also functions when the subscriber terminal is roaming. In addition, the solution is convenient for an operator managing a service access point; provisioning does not require the delivery of a SIM card to the user, for example, and yet authentication is in a way based on an existing SIM card placed into a subscriber terminal.

LIST OF FIGURES

In the following the invention will be described in greater detail with reference to the preferred embodiments and the accompanying drawings, in which.

DESCRIPTION OF EMBODIMENTS

Figure 1:
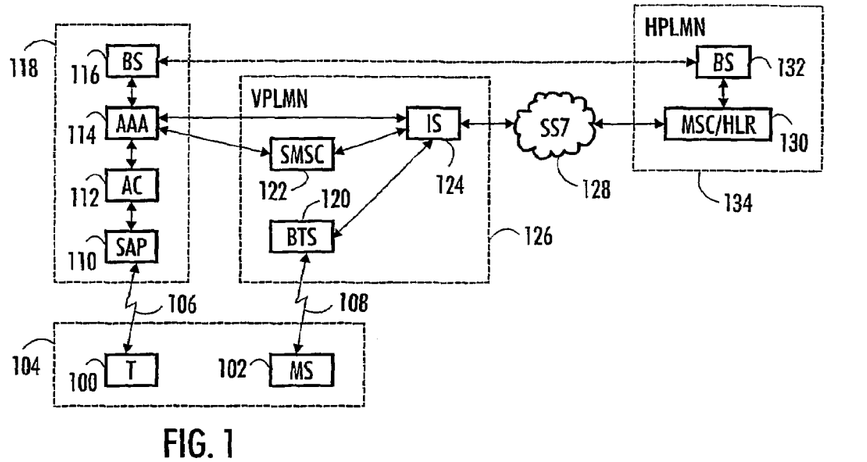
FIG. 1 is a schematic block diagram illustrating a system for authenticating a user of a data transfer device.

FIG. 1 shows a simplified example of a system for authenticating a user of a data transfer device 100 and also illustrates connections from the system to other necessary parts with which information is exchanged and which are used for implementing data transfer connections.

There are four main parts that can be distinguished: devices 104 at the user's disposal; a data transfer network 118 serving the data transfer device 100, a visited mobile communications system 126 and a home mobile communications system 134.

The data transfer network 118 comprises a Service Access Point (SAP) 110 that can be linked to the data transfer device 100 over a first data transfer connection 106. The service access point 110 forms what is known as an Access Zone (AZ, also known as a Hotspot) in an office, university campus area, hotel or airport, for example, where local area network connections are being offered to users. Users of portable computers, for example, can thus be provided with a fast broadband service via the access zone. In addition, the data transfer network 118 comprises an authentication server 114 connected to the service access point 110 over a second data transfer connection.

According to an embodiment, the first data transfer connection 106 is a radio connection. The radio connection 106 can be implemented by configuring the service access point 110 to use a Wireless Local Area Network (WLAN) to implement the radio connection 106. In another embodiment the service access point 110 comprises a short-range radio transceiver for implementing the radio connection 106. The short-range radio transceiver may be, for example, a radio transceiver based on the Bluetooth® technology or a wireless local area network based on IEEE (The Institute of Electrical and Electronics Engineers, Inc.) 802.11 or 802.11b standard.

The role of the service access point 110 is to function as a port through which the services of the data transfer network 118 are provided to the data transfer device 100. If the first data transfer connection 106 is implemented over a wireless local area network, the service access point 110 may be a service access point of the wireless local area network, such as a service access point of the type Nokia® A032 used in a wireless local area network and serving as a wireless Ethernet bridge to the local area network. In that case the service access point 110 comprises a radio module for implementing radio connections and the necessary equipment and software for encrypting the data on the radio connections. The service access point 110 may also comprise an external modem that allows a Dial-up Access to be implemented to an Internet Service Provider (ISP), in which case the service access point may comprise a firewall, for example one implemented on the basis of the NAT. (Network Address Translation) technology, for protecting the local network.

In addition, the data transfer network 118 may comprise an Access Controller (AC) 112 between the service access point 110 and the authentication server 114, the controller serving as a gateway between the access zone and the Internet. It is thus possible to gain access from the data transfer network 118 through the access controller 112 to a WWW server (World-Wide Web) with which the data transfer device 100 can then exchange information after authentication. The access controller 112 may be a Nokia® P022 type access controller, for example, which is responsible for user authentication, realtime network monitoring and for collecting accounting data for billing.

According to an embodiment, the authentication server 114 is an AAA server (Authentication, Authorization and Accounting), which means that the server is not only responsible for user authentication, i.e. for confirming the alleged identity of the user, but also for authorizing the use of the system and for accounting operations carried out for billing the use of the system. The authentication server 114 may apply an AAA protocol defined by the IETF (Internet Engineering Task Force), such as the Radius protocol (Remote Authentication Dial-In User Service, RADIUS) or the Diameter protocol. In the wireless local area network the authentication server 114 transfers authentication data and billing data between the data transfer network 118 and the mobile communications system 126, 134.

According to an embodiment, the first data transfer connection 106 is wired. The data transfer connection may be implemented using any prior art network technology enabling bi-directional wired data transfer between the service access point 110 and the data transfer device 100. One example of this type of network technology is a wired local area network based on IEEE 802.3 standard, i.e. an Ethernet standard, and implemented using a coaxial cable or a twisted pair, for example.

FIG. 1 shows parts of a visited mobile communications network 126 and a home mobile communications network 134, because according an embodiment the first data transfer connection 106 is implemented when the subscriber terminal 102 is roaming. Roaming functionality is a functional entity in Mobility Management (MM), which enables correct call routing when a user and his/her subscriber terminal 102 are roaming from one network to another, for example from a mobile communications system 134 managed by a national operator of the subscriber's home country to a foreign mobile communications system 126 managed by a foreign operator. Another possible embodiment is one where only the home mobile communications system 134 is needed, for example when the user remains in the home country. In the description below, the parts of the mobile communications systems 126, 134 shown in FIG. 1 are therefore, where applicable, in one and the same mobile communications system.

The mobile communications system 126, 134 may be any prior art radio system that allows information to be transferred from a network part of the mobile communications system to a subscriber terminal 104 connected to the network part over a radio link 108. The following mobile communications systems can be mentioned as examples: second generation GSM (Global System for Mobile Communications), GSM-based GRPS (General Packet Radio System) that employs 2,5-generation EDGE technology (Enhanced Data Rates for Global Evolution) for increasing data transfer rate or the EGPRS (Enhanced GPRS) and the third-generation mobile communications system known at least by the names IMT-2000 (International Mobile Telecommunications 2000) and UMTS (Universal Mobile Telecommunications System). However, the embodiments are not restricted to these examples, but those skilled in the art will be able to apply the teachings of the invention also to other radio systems having similar characteristics. When necessary, additional information about the mobile communications system in question is available from specifications of the field, for example from those of the GSM system or the UMTS, and from the literature of the art, for example from Juha Korhonen: *Introduction to 3G Mobile Communications*. Artech House 2001. ISBN 1-58053-287-X.

The service access point 110 is configured to receive over the first data transfer connection 106 the mobile subscriber identification data inputted from the data transfer device 100 and to transmit the mobile subscriber identification data over a second data transfer connection to the authentication server 114. According to an embodiment, the identification data of the subscriber of the mobile communications system 134 consist of a Mobile Subscriber International Integrated Services Digital Network Number (MSISDN), which identifies the subscriber globally and unambiguously because the MSISDN consists of three parts: country code, national network identifier and subscriber number.

The authentication server 114 is configured to use a third data transfer connection to check from the mobile communications system 134 whether the subscriber identification data contains an access right to the service access point 110 and, if a valid access right exists, to generate a password and to transmit the password to the subscriber terminal 102 corresponding to the identification data of the subscriber of the mobile communications system 134. The authentication server 114 may also generate the necessary User Account, if one does not exist already. In connection with login to the service access point 110, the data transfer device 100 is configured to use the password delivered to the subscriber-terminal 102. The password that was generated may be a character string containing letters and/or numbers and/or different special characters, for example. The character string may be defined using ASCII codes (American Standard Code for Information Interchange), for example. Login may be performed using for example a WWW dialog or, in accordance with IEEE 802.1x standard, using the dial-in dialog of the operating system of the data transfer device.

The data transfer device 100 is of a type enabling a bi-directional data transfer connection 106 to be set up to the service access point 110. The data transfer device may thus be for example a portable computer provided with an Ethernet card, a Bluetooth® transceiver, or a card implementing a wireless local area network which may comprise a short-range radio transceiver, for example. One example of a card implementing a local area network is a wireless local area network card of the Nokia® C110/C111-type, although it should be noted that the system for user authentication functions without the SIM card reader contained in the cards of this type. Another example is a radio card of the Nokia® D211-type, which functions in various modes for implementing a data transfer connection, such as: wireless local area network, GPRS and HSCSD (High Speed Circuit Switched Data).

The subscriber terminal 102 is of a type that enables a wireless data transfer connection to be set up to the mobile communications system 126. In the UMTS, for example, the subscriber terminal 102 consists of two parts: Mobile Equipment (ME) and UMTS Subscriber Identity Module (USIM), i.e. a SIM card. The SIM card contains user data and, in particular, data associated with information security, for example an encryption algorithm. In the GSM, the subscriber terminal 102 naturally uses the SIM card of the GSM system. The subscriber terminal 102 contains at least one transceiver for setting up a radio connection 102 to a radio access network or base station system of the mobile communications system 126. FIG. 1 shows a base station 120 of the mobile communications system 126 to which the subscriber terminal 102 sets up the radio connection 108. One subscriber terminal 102 may contain at least two different subscriber identity modules. In addition, the subscriber terminal 102 contains an antenna, a user interface and a battery. Current subscriber terminals 102 take diverse forms; they may be vehicle-mounted or portable, for example. Subscriber terminals 102 have also been provided with characteristics better known from PC's or portable computers. One example of this type of subscriber terminal 102 is Nokia® Communicator®.

In the example of FIG. 1, the devices 104 that are at the user's disposal, i.e. the data transfer device 100 and the subscriber terminal 102, are shown as separate devices, although according to one embodiment they may be located in one and the same physical device, for example in a Nokia® Communicator-type device, in which the characteristics required of the data transfer device 100 have been implemented by means of a wireless local area network card, and the characteristics of the subscriber terminal 102 by means of a mobile subscriber terminal incorporated in the device and a SIM card provided by a mobile operator. In this kind of combination device the processing of the information needed in authentication can be automated for example by transferring the password received at the subscriber terminal 102 automatically to the log-in dialog of the data transfer device 100.

According to an embodiment, the authentication server 114 is configured to transmit the password to the subscriber terminal 102 in the form of a packet-switched message. In one embodiment the authentication server 114 is configured to transmit the password to the subscriber terminal 102 in a Short Message (SM). The short message can be implemented using a Short Message Service (SMS), for example. FIG. 1 shows a Short Message Service Centre (SMSC) 122 of the mobile communications system 126, through which centre the short messages are transferred and into which they may be stored if they cannot be delivered immediately to the receiver 102. In principle the short message service centre 122 is not a part of the mobile communications system 126, although it is often integrated into a Mobile Service Switching Centre (MSC). There are also other ways of transmitting a text message, for example by using the Multimedia Messaging Service (MMS). MMS is a new type of service in which the method of transmission corresponds to that of the SMS. An MMS message may, however, contain three different simultaneous elements: text, audio and image.

According to an embodiment, the authentication server 114 is configured to check the access right to the service access point 110 by submitting a query to a home location register 130 of the mobile communications system 134. FIG. 1 only shows the base station 120 and the short message service centre 122 of the mobile communications system 126; the rest of the infrastructure is depicted by block 124. From the infrastructure of the visited mobile communications system 126 there is a data transfer connection 128, provided for example by means of signalling system no. 7 (SS7, ITU-T No. 7) of the ITU-T, the telecommunications standardization sector of the International Telecommunications Union, to the home mobile communications system 134, of which only the Home Location Register (HLR) 130 is shown, which contains the subscriber parameters of all subscribers of the mobile communications system 134 permanently stored therein. Since the home location register 130 is usually at the mobile services switching centre, block 130 in FIG. 1 also includes the switching centre.

According to an embodiment mentioned earlier, the identification data of the subscriber of the mobile communications system 134 consist of the mobile subscriber international ISDN number. In that case the authentication server 114 may be configured to submit a query in which it first searches the home location register 130 of the mobile communications system 134 for the International Mobile Subscriber Identity (IMSI) corresponding to the mobile subscriber international ISDN number and then uses the international mobile subscriber identity to search the home location register 130 of the mobile communications system 134 for the related subscriber data, where the access right is defined.

According to an embodiment, the system further comprises an accounting server 116, which is configured to generate the billing data relating to the first data transfer connection 106 and to transfer the data to the mobile communications system 134, in which the billing data are formed into a bill associated with the identification data of the subscriber of the mobile communications system 134. In the example of FIG. 1 we have a situation where the subscriber terminal 102 is within the area of the visited mobile communications system 126, in which case the billing data generated at the accounting server 116 are transferred to an accounting server 132 of the home mobile communications system 134. The billing data may be transferred using for example Charging Records (CDR) directed to the IMSI.

According to an embodiment, the service access point 110 is configured to maintain the first data transfer connection 106 initially set up between the data transfer device 100 and the service access point 110 until login. In other words, in this embodiment the first data transfer connection 106 is not disconnected at any stage and therefore mere capture of a password by an unauthorized intruder does not create a major data security risk, because the intruder would also have be able to capture the first data transfer connection 106. The data transfer connection 106 uses an SSL protocol (Secure Sockets Layer), for example, for authenticating and encrypting TCP (Transmission Control Protocol) connections. Instead of the SSL, a protocol known as TLS (Transport Layer Security) can also be used. The encryption keys to be used may be derived from TLS authentication or simply from the password by means of strong password authentication protocols (such as the Secure Remote Password protocol or Encrypted Key Exchange protocol).

According to an embodiment, the authentication server 114 is configured to transmit a second password via the service access point 110 to the data transfer device 100 over the first data transfer connection 106, the data transfer device 100 being configured to also use the second password at login, for example such that the two passwords placed one after the other form the required password. This embodiment ensures that the user offering the second password is the same as the one who used the data transfer device 100 to order the password to the subscriber terminal 102.

According to an embodiment, the authentication server 114 is configured to transmit a confirmation identifier via the service access point 110 to the data transfer device 100 over the first data transfer connection 106 and to transmit the same confirmation identifier to the subscriber terminal 102 together with the password. This enables the user to compare the two confirmation identifiers received over different data transfer paths and to use the password only if the two confirmation identifiers are the same. With this embodiment the user is assured that the password came to the subscriber terminal 102 from the source 114 requested by the user with his/her data transfer device 100.

According to an embodiment, the data transfer device 100 is configured to log in to the service access point 110 using the mobile subscriber identification data, for example the already mentioned mobile subscriber international ISDN or the international mobile subscriber identity, as a user ID, although the latter may be more difficult for the user to find out than the mobile subscriber international ISDN. An advantage of this embodiment is that the system does not need to transfer the user ID towards the user.

However, embodiments in which the user ID is transferred from the system towards the user are also possible. In such cases the user ID does not need to be originally known by the user but it may be generated at the authentication server 114, for example. According to an embodiment, the authentication server 114 is configured to transmit the user ID to the subscriber terminal 102 corresponding to the identification data of the subscriber of the mobile communications system 134 and the data transfer device 100 is configured to use the user ID received at the subscriber terminal 102 to log in to the service access point 110. According to an embodiment, the authentication server 114 is configured to transmit the user ID from the service access point 110 to the data transfer device 100 over the first data transfer connection 106 and the data transfer device 100 is configured to use the user ID received at the data transfer device 100 to log in to the service access point 110.

We have described above how the service access point 110, authentication server 114 and data transfer device 100 are to be configured to enable the system for authenticating the user of the data transfer device 100 to be implemented. The devices in question comprise control parts controlling their operation, the control parts being currently usually implemented as a processor with the related software, although different hardware implementations are also possible, for example a circuit consisting of separate logic components or one or more Application-specific Integrated Circuits (ASIC). Also a hybrid of these different implementations is possible. When selecting the method of implementing the configuration, a person skilled in the art will take into account for example the requirements set to the size and power consumption of the device, the required processing power, manufacturing costs and production volumes.

With reference to the flow diagram of FIG. 2, the method for authenticating the user of the data transfer device will be described in the following. At the same time, reference is made to the signal sequence diagram of FIG. 3, which illustrates the information transmitted between different network elements in connection with the authentication of the data transfer device user. For the sake of clarity, the service access point 110 and the service access controller 112 are combined into a single element in FIG. 3, and internal elements of the visited mobile communications system 126 and the home mobile communications system are not shown.

The execution of the method starts at 200, when the user wishes to use the service access point.

At 202 a data transfer connection is first set up from the data transfer device to the service access point. According to an embodiment, the data transfer connection between the data transfer device and the service access point is a radio connection. According to an embodiment, the radio connection is implemented with a wireless local area network. According to another embodiment, the radio connection is implemented using a short-range radio transceiver. In another embodiment, the data transfer connection between the data transfer device and the service access point is wired. As regards these different methods of implementing the data transfer connection reference is made to the disclosure above.

Next, at 204 the identification data of the mobile subscriber are inputted 204 to the service access point. According to an embodiment, the mobile subscriber identification data consist of the mobile subscriber international ISDN. As shown in FIG. 3, the MSISDN 300 is transmitted from the data transfer device 100 to the service access point/service access controller 110, 112.

At 206 the access right of the subscriber identification data to the service access point is then checked from the mobile communications system. According to an embodiment, the checking is made by means of a query sent to the home location register of the mobile communications system. In the embodiment in which the mobile subscriber identification data consist of the mobile subscriber international ISDN, the query can be made as shown in FIG. 3 such that first the home location register of the mobile communications system 134 is searched for the international mobile subscriber identity (IMSI) corresponding to the mobile subscriber international ISDN by means of a MAP_SEND_IMSI message (MAP=Mobile Application Part protocol) 304, 306 and a REPLY 308, 310 received to the query and then, on the basis of the international mobile subscriber identity, the home location register of the mobile communications system 134 is searched for the subscriber data, which contains the access right definition, by means of a MAP_RESTORE_DATA message 312, 314 and a REPLY 316, 318 received to it. Since in the example of FIG. 3 the subscriber terminal 102 is within the area of the visited mobile communications system 126, the messages to and from the home mobile communications service 134 travel through the visited system.

At 208 is then checked whether the mobile subscriber identification data has access right to the service access point. If there is no access right, or it is not valid, the routine proceeds to 210, which means that no service can be provided to the user through the service access point, and then to 220 where the execution of the method is terminated.

If a valid access right exists, the routine proceeds from 208 to 212 where the password is generated. The routine then proceeds to 214 where the password is transmitted to the subscriber terminal corresponding to the mobile subscriber identification data. According to an embodiment, the password is transmitted to the subscriber terminal in a packet-switched message. According to another embodiment, the password is transmitted to the subscriber terminal 102 in a short message SMS 320, 322, 324, 326, as shown in FIG. 3, starting from the authentication server 114 and going through the visited mobile communications system 126, the home mobile communications system 134 and then again the visited mobile communications system 126. The embodiment can be modified as described earlier.

Next, at 216 the service access point is logged in from the data transfer device using the password delivered to the subscriber terminal. In FIG. 3 this is illustrated in the form of a log-in dialog in which the user ID and the password are transmitted from the data transfer device 100 to the service access point/service access controller 110, 112 in a LOGIN message 328, which is further transmitted to the authentication server 114 in a LOGIN message 330 to which a REPLY message 332 is received at the service access point/service access controller 110, 112. Then at 218 the data transfer device user is able to use data transfer services via the service access point. A service is implemented by transferring SERVICE messages 334 to and from, as needed, the data transfer device 100 and the service access point/service access controller 110, 112. Finally when the user switches off the connection from the data transfer device to the service access point, the execution of the method is terminated at 220.

According to an embodiment, the method further comprises: billing for the data transfer connection between the data transfer device and the service access point in a bill directed to the identification data of the mobile subscriber. As shown in FIG. 3, this may be carried out for example by transferring from the service access point/service access controller 110, 112 a CDR message 336, 338 containing billing data through the authentication server 114 to the home mobile communications system 134.

According to an embodiment, the data transfer connection set up at the beginning between the data transfer device and the service access point is kept until login takes place. This provides the above described advantage of information security.

According to an embodiment, the method further comprises: transmitting a second password from the service access point to the data transfer device over a data transfer connection and using also the second password at login. Also this embodiment enhances information security, as described above.

According to an embodiment, the method further comprises: transmitting from the service access point a confirmation identifier to the data transfer device over the data transfer connection and transmitting the same confirmation identifier together with the password, the password being only used if the received confirmation identifiers are the same. This embodiment has also-been described above.

According to an embodiment, the method further comprises: using the mobile subscriber identification data as a user ID when logging in. According to an embodiment, the method further comprises: transmitting the user ID to the subscriber terminal corresponding to the mobile subscriber identification data and using the transmitted user ID when logging in. According to an embodiment, the method further comprises: transmitting the user ID to the data transfer device over the data transfer connection and using the transmitted user ID when logging in.

The method can be implemented using the system described above with reference to FIG. 1, although other environments are also possible.

According to an embodiment, the visited mobile communications system 126 is configured to inform the subscriber terminal 102 that if a roaming of the subscriber terminal in the visited mobile communications system 126 fulfils a predetermined criterion, a lower charge than usual will be applied to the data transfer connection 106 from the data transfer device 100 to the service access point 110. In addition, the authentication server 114 is configured to implement the data transfer connection 106 from the data transfer device 100 to the service access point 110 at a lower charge than usual, if the predetermined criterion is met. At first the predetermined criterion may be that the subscriber terminal 102 contacts the visited mobile communications network 126 and later the criterion may be that the subscriber terminal 102 remains in the mobile communications system 126 it has selected. The purpose of this is to make the user of the roaming subscriber device 102 to prefer that the subscriber device 102 use specifically the mobile communications system 126 managed by the operator in question for the entire duration of the roaming. The use of the mobile communications system 126 generates income to the operator and thus allows the operator to offer the data transfer connection 106 to the service access point 110 at a lower charge, even free of charge in extreme cases, for the duration of the visit.

Next, a method is described that can be used for implementing this kind of roaming that creates customer loyalty. The visited mobile communications system 126 is informed of a new subscriber terminal 102 by a location update performed by the subscriber terminal 102 upon its entry into the coverage area of the base station 120. Next, an SMS message (SMS=Short Message Service) is sent from the mobile communications system 126 to the subscriber terminal 102 to inform that if the user remains in this mobile communications system 126, the data transfer connection 106 will be provided free of charge, through a public wireless local area network, for example, to the service access point 110. In addition, the SMS message may contain instructions informing that if the user wishes to use this service, he/she should send a reply SMS message from his/her subscriber terminal 102 to a specific number. The reply SMS message should be blank or have a predetermined content, such as abbreviation "WLAN".

If the user is expected to reply with an SMS message, then upon receipt of the message, and otherwise immediately after having sent the message, the visited mobile communications system 126 informs the authentication server 114 that data transfer services may be provided free of charge to the user through the service access point 110. The reply SMS message expected of the user allows to avoid unnecessary loading of the system by users who are not interested in the service in question. The information to the authentication server 114 can be transmitted in an SMS message sent from the visited mobile communications system 126, for example. This requires that the authentication server functions as an SME (Short Message Entity) or is capable of receiving a MAP_MT_FORWARD_SHORT_MESSAGE message based on the MAP protocol. The information contains the identifier of the user, such as an MSISDN or IMSI. The authentication server 114 parses the contents of the SMS message and analyses the identifier of the user.

The authentication server 114 is thus informed that data transfer services available from the data transfer network 118 may be provided free of charge to a specific user through the service access point 110. The authentication server 114 then creates a user ID for the user, such as an MSISDN or IMSI. In addition, a password is created. The user ID and the password may be delivered to the user as described above, although other suitable prior art methods for implementing authentication may possibly also be used. At the same time, it is possible to submit additional information to the user. The use provided free of charge may at first cover a predetermined period, for example fifteen minutes. The user ID is activated if the user uses it for logging in to the service access point 110. The contents of the user ID may include the following:
   user ID: +35840123456
   password: qwertyiop
   time: 90 minutes
   created: 19102002;09:16:48
   valid: 29102002;09:16:48
   service quality: low
   billing: NULL
   time release of session: 900 seconds.

The duration of the service provided free of charge to the user through the data transfer network 118 may be extended if the subscriber terminal 102 of the user continues roaming in the mobile communications system 126 for a predetermined period. A convenient way to check whether roaming continues is to send a period query to this effect, one or twice an hour, for example, to the home location register 130 of the home mobile communications system 134 of the subscriber terminal 102. The query may be implemented using a MAP_SEND_ROUTING_INFO_FOR_SM message of the MAP protocol, for example, which is replied by a SEND_ROU_FOR_SM message containing the PLMN address (Public Land Mobile Network) of the serving mobile services switching centre. If this address belongs to the same mobile communications system as the service access point, it is concluded that roaming continues. The session of the data transfer device 100 at the service access point 110 may be terminated either by the user or by the service access point, which switches off the connection when the time provided free of charge runs out. The user ID may be deleted from the authentication server 114 after a predetermined time, for example a month, or when it is detected that the user of the subscriber terminal 102 has terminated the roaming.

Figure 2:
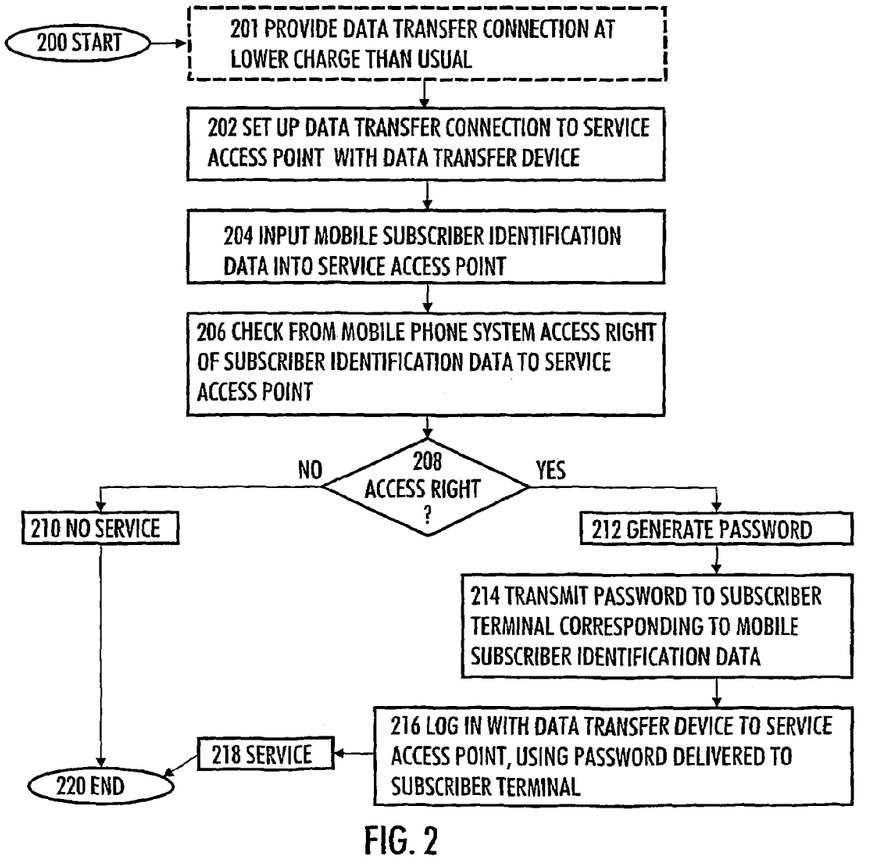
FIG. 2 is a flow diagram illustrating a method for authenticating a user of a data transfer device.
Figure 3:
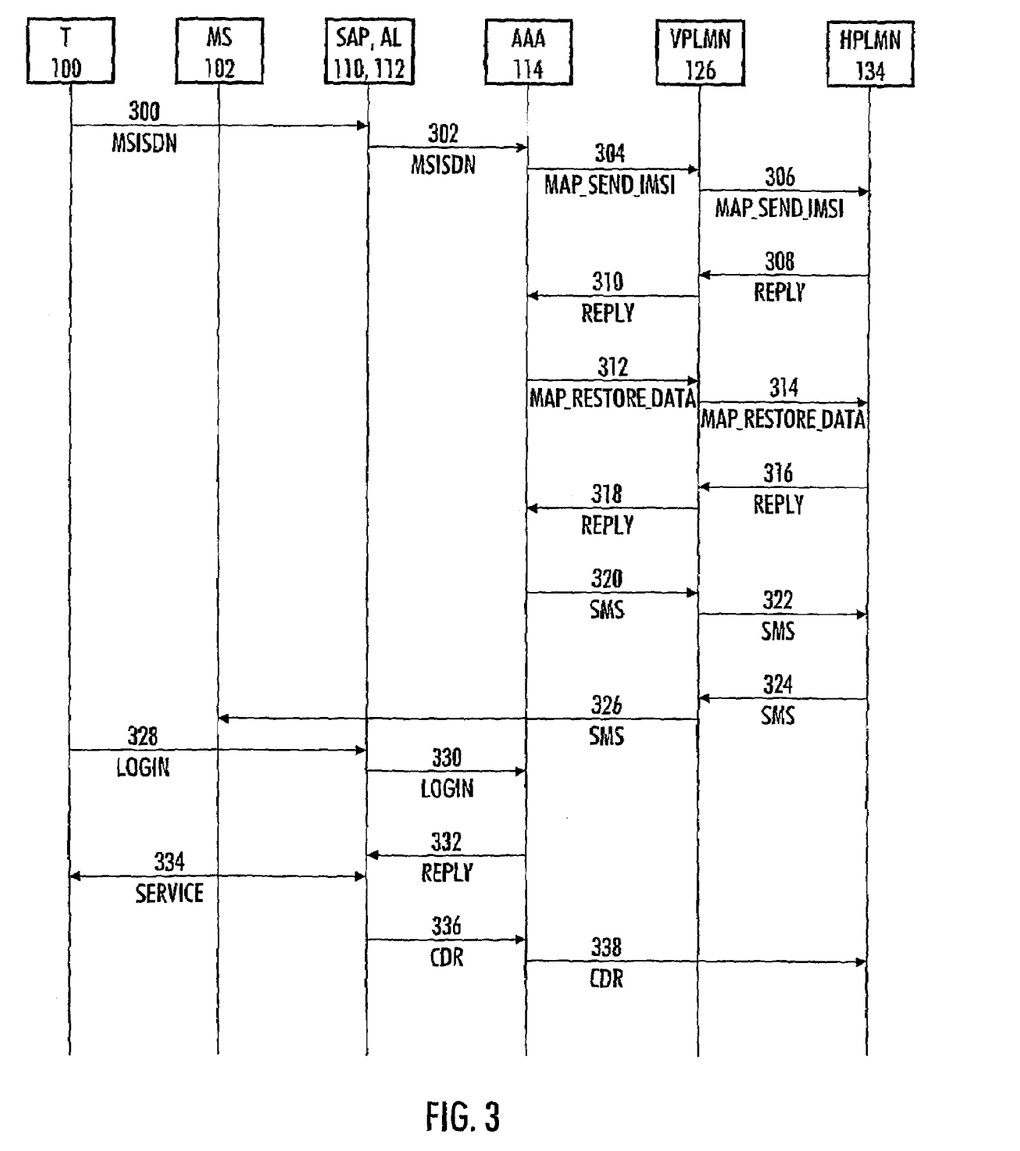
FIG. 3 is a signal sequence diagram illustrating information transmitted between different network elements in connection with the authentication of a data transfer device user.

In FIG. 2 the arrangement 201 of this kind of lower charge data transfer connection takes place before the described authentication. The procedure of block 206 is not necessarily needed if the authentication server has received information from the visited mobile communications system stating that a data transfer connection to the service access point may be provided at a lower charge than usual for the data transfer device of the user of the subscriber terminal. The predetermined criterion is met if the subscriber terminal contacts the visited mobile communications system and/or if the roaming by the subscriber terminal in the visited mobile communications system continues for a predetermined time. That the predetermined criterion is met can be checked by means of a period query made to the home location register of the home mobile communications system of the subscriber terminal; although the execution of the method shown in FIG. 2 may have been terminated at this point already, the user can be provided with a service at lower charge the next time he/she logs in from his/her data transfer device to the service access point. The procedures of blocks 201, 206, 212 and 214 do not necessarily have to be carried out in connection with a subsequent login, unless the operator wishes to change the password.

Although the invention is described above with reference to an example based on the accompanying drawings, it is apparent that the invention is not restricted to it but may be varied in many ways within the scope of the inventive idea disclosed in the accompanying claims. It is to be noted, in particular, that the names of the network elements and the distribution of their functionalities may vary, because, after all, it is merely a question of the desired degree of integration of the network elements and the size of the data transfer network 118: in large networks a network element may be dedicated to specific tasks only, whereas in small networks one network element may carry out a plural number of functions, which in FIG. 1 are shown separately.

The invention claimed is:

1. A method, comprising:
   setting up a data transfer connection from a data transfer device to a service access point;
   inputting identification data of a subscriber of a mobile communications system to the service access point;
   checking from the mobile communications system whether the mobile subscriber identification data contains an access right to the service access point;
   if a valid access right exists, generating a password, transmitting the password to a subscriber terminal corresponding to the mobile subscriber identification data, and logging in to the service access point from the data transfer device using the password transmitted to the subscriber terminal; and
   transmitting a confirmation identifier from the service access point to the data transfer device over a data transfer connection and transmitting the same confirmation identifier to the subscriber terminal together with the password, the password being only used if the received confirmation identifiers are the same.

2. A method according to claim 1, wherein the mobile subscriber identification data comprises a mobile subscriber international integrated services digital network number mobile station international subscriber directory number.

3. A method according to claim 1, wherein in connection with the check, further comprising:
   sending a query to the home location register of the mobile communications system.

4. A method according to claim 3, wherein the mobile subscriber identification data comprises the mobile subscriber international integrated services digital network number, the method further comprising:
   searching for the international mobile subscriber identity international mobile subscriber identity corresponding to the mobile subscriber international integrated services digital network number with the query first the home location register of the mobile communications system; and
   searching for the related subscriber data, where the access right is defined, with the international mobile subscriber identity the home location register of the mobile communications system.

5. A method according to claim 1, wherein the password is transmitted to the subscriber terminal in a packet-switched message.

6. A method according to claim 1, wherein the password is transmitted to the subscriber terminal in a short message.

7. A method according to claim 1, wherein the data transfer connection between the data transfer device and the service access point is a radio link.

8. A method according to claim 7, wherein the radio link is implemented using a wireless local area network.

9. A method according to claim 7, wherein the radio link is implemented using a short-range radio transceiver.

10. A method according to claim 1, wherein the data transfer connection between the data transfer device and the service access point is wired.

11. A method according to claim 1, wherein the method further comprises:
   billing for the data transfer connection between the data transfer device and the service access point in a bill directed to the identification data of the mobile subscriber.

12. A method according to claim 1, wherein the data transfer connection initially set up between the data transfer device and the service access point is maintained until login.

13. A method according to claim 1, wherein the method further comprises:
using the mobile subscriber identification data as a user identification in connection with login.

14. A method, comprising:
setting up a data transfer connection from a data transfer device to a service access point;
inputting identification data of a subscriber of a mobile communications system to the service access point;
checking from the mobile communications system whether the mobile subscriber identification data contains an access right to the service access point;
if a valid access right exists, generating a password, transmitting the password to a subscriber terminal corresponding to the mobile subscriber identification data, and logging in to the service access point from the data transfer device using the password transmitted to the subscriber terminal; and
transmitting a user identification to the subscriber terminal corresponding to the mobile subscriber identification data and using the transmitted user identification in connection with login.

15. A method, comprising:
setting up a data transfer connection from a data transfer device to a service access point;
inputting identification data of a subscriber of a mobile communications system to the service access point;
checking from the mobile communications system whether the mobile subscriber identification data contains an access right to the service access point;
if a valid access right exists, generating a password, transmitting the password to a subscriber terminal corresponding to the mobile subscriber identification data, and logging in to the service access point from the data transfer device using the password transmitted to the subscriber terminal; and
transmitting a user identification to the data transfer device over a data transfer connection and using the transmitted user identification in connection with login.

16. A system comprising:
a data transfer device;
a service access point configured to be linked to the data transfer device over a first data transfer connection; and
an authentication server configured to be linked to the service access point over a second data transfer connection,
wherein
the service access point is configured to receive over the first data transmission connection identification data of a subscriber of a mobile communications system inputted from the data transfer device and to transmit the mobile subscriber identification data to the authentication server over the second data transfer connection,
the authentication server is configured to check from the mobile communications system over a third data transfer connection whether the mobile subscriber identification data contains an access right to the service access point and, if a valid access right exists, to generate a password and transmit the password to a subscriber terminal corresponding to the identification data of the subscriber of the mobile communications system,
the data transfer device is configured to use the password transmitted to the subscriber terminal in connection with login to the service access point, and
the authentication server is configured to transmit a confirmation identifier via the service access point to the data transfer device over the first data transfer connection and to transmit the same confirmation identifier to the subscriber terminal together with the password.

17. A system according to claim 16, wherein the identification data of the subscriber of the mobile communications system comprises the mobile subscriber international integrated services digital network.

18. A system according to claim 16, wherein the authentication server is an authentication, authorization, and accounting server.

19. A system according to claim 16, wherein for checking the access right to the service access point, the authentication server is configured to transmit a query to the home location register of the mobile communications system.

20. A system according to claim 19, wherein the identification data of the subscriber of the mobile communications system comprises the mobile subscriber international integrated services digital network number, and the authentication server is configured to submit the query to first search the home location register of the mobile communications system for the international mobile subscriber identity corresponding to the mobile subscriber international integrated services digital network number and then use the international mobile subscriber identity to search the home location register of the mobile communications system for the related subscriber data, where the access right is defined.

21. A system according to claim 16, wherein the authentication server is configured to transmit the password to the subscriber terminal in a packet-switched message.

22. A system according to claim 16, wherein the authentication server is configured to transmit the password to the subscriber terminal in a short message.

23. A system according to claim 16, wherein the first data transfer connection is a radio link.

24. A system according to claim 23, wherein the service access point is configured to implement the radio link using a wireless local area network.

25. A system according to claim 23, wherein the service access point comprises a short-range radio transceiver for implementing the radio link.

26. A system according to claim 16, wherein the first data transfer connection is wired.

27. A system according to claim 16, wherein the system further comprises an accounting server, which is configured to generate the billing data relating to the first data transfer connection and to transfer the data to the mobile communications system, in which the billing data are formed into a bill associated with the identification data of the subscriber of the mobile communications system.

28. A system according to claim 16, wherein the service access point is configured to maintain the first data transfer connection initially set up between the data transfer device and the service access point until login.

29. A system according to claim 16, wherein the data transfer device is configured to use the mobile subscriber identification data as the password to log in to the service access point.

30. A system comprising:
a data transfer device;
a service access point configured to be linked to the data transfer device over a first data transfer connection; and
an authentication server configured to be linked to the service access point over a second data transfer connection, wherein the service access point is configured to receive over the first data transmission connection identification data of a subscriber of a mobile communications system inputted from the data transfer device and to transmit the mobile subscriber identification data to the authentication server over the second data transfer connection, the authentication server is configured to check from the mobile communications system over a third data transfer connection whether the mobile subscriber identification data contains an access right to the service access point and, if a valid access right exists, to generate a password and transmit the password to a subscriber terminal corresponding to the identification data of the subscriber of the mobile communications system, the data transfer device is configured to use the password transmitted to the subscriber terminal in connection with login to the service access point, and the authentication server is configured to transmit a second password from the service access point to the data transfer device over the first data transfer connection and the data transfer device is configured to also use the second password in connection with login.

31. A system comprising:

a data transfer device;

a service access point configured to be linked to the data transfer device over a first data transfer connection; and an authentication server configured to be linked to the service access point over a second data transfer connection, wherein the service access point is configured to receive over the first data transmission connection identification data of a subscriber of a mobile communications system inputted from the data transfer device and to transmit the mobile subscriber identification data to the authentication server over the second data transfer connection, the authentication server is configured to check from the mobile communications system over a third data transfer connection whether the mobile subscriber identification data contains an access right to the service access point and, if a valid access right exists, to generate a password and transmit the password to a subscriber terminal corresponding to the identification data of the subscriber of the mobile communications system, the data transfer device is configured to use the password transmitted to the subscriber terminal in connection with login to the service access point, and the authentication server is configured to transmit a user identification to the subscriber terminal corresponding to the identification data of the subscriber of the mobile communications system and the data transfer device is configured to use the user identification transmitted to the subscriber terminal in connection with login to the service access point.

32. A system comprising:

a data transfer device;

a service access point configured to be linked to the data transfer device over a first data transfer connection; and an authentication server configured to be linked to the service access point over a second data transfer connection, wherein the service access point is configured to receive over the first data transmission connection identification data of a subscriber of a mobile communications system inputted from the data transfer device and to transmit the mobile subscriber identification data to the authentication server over the second data transfer connection, the authentication server is configured to check from the mobile communications system over a third data transfer connection whether the mobile subscriber identification data contains an access right to the service access point and, if a valid access right exists, to generate a password and transmit the password to a subscriber terminal corresponding to the identification data of the subscriber of the mobile communications system, the data transfer device is configured to use the password transmitted to the subscriber terminal in connection with login to the service access point, and the authentication server is configured to transmit the user identification via the service access point to the data transfer device over the first data transfer connection and the data transfer device is configured to use the user identification transmitted to the data transfer device in connection with login to the service access point.

33. A method, comprising:

receiving, over a second data transmission connection, mobile subscriber identification data of a subscriber of a mobile communications system from a service access point, wherein the service access point receives the identification data of the subscriber over a first data transmission connection from a data transfer device;

checking, over a third data transmission connection, from the mobile communications system over a data transfer connection whether the mobile subscriber identification data contains an access right to the service access point and, if a valid access right exists;

generating a password and transmitting the password to a subscriber terminal corresponding to the identification data of the subscriber of the mobile communications system, wherein the password transmitted to the subscriber terminal is used by a data transfer device in connection with login to the service access point; and transmitting a second password from the service access point to the data transfer device over the first data transfer connection, wherein the data transfer device is configured to also use the second password in connection with login.

34. A method, comprising:

receiving mobile subscriber identification data of a subscriber of a mobile communications system from a service access point;

checking from the mobile communications system over a data transfer connection whether the mobile subscriber identification data contains an access right to the service access point;

if a valid access right exists, generating a password and transmitting the password to a subscriber terminal corresponding to the identification data of the subscriber of the mobile communications system, wherein the password transmitted to the subscriber terminal is used by a data transfer device in connection with login to the service access point;

transmitting a confirmation identifier via the service access point to the data transfer device; and transmitting the same confirmation identifier to the subscriber terminal together with the password.

35. A method, comprising:

receiving mobile subscriber identification data of a subscriber of a mobile communications system from a service access point;

checking from the mobile communications system over a data transfer connection whether the mobile subscriber identification data contains an access right to the service access point and, if a valid access right exists;
generating a password and transmitting the password to a subscriber terminal corresponding to the identification data of the subscriber of the mobile communications system, wherein the password transmitted to the subscriber terminal is used by a data transfer device in connection with login to the service access point; and
transmitting a user identification to the subscriber terminal corresponding to the identification data of the subscriber of the mobile communications system, wherein the user identification is also used in connection with login to the service access point.

36. A method, comprising:
receiving mobile subscriber identification data of a subscriber of a mobile communications system from a service access point;
checking from the mobile communications system over a data transfer connection whether the mobile subscriber identification data contains an access right to the service access point and, if a valid access right exists;
generating a password and transmitting the password to a subscriber terminal corresponding to the identification data of the subscriber of the mobile communications system, wherein the password transmitted to the subscriber terminal is used by a data transfer device in connection with login to the service access point; and
transmitting a user identification via the service access point to the data transfer device, wherein the user identification is also used in connection with login to the service access point.

37. An apparatus, comprising:
a receiver configured to receive over a second data transmission connection mobile subscriber identification data of a subscriber of a mobile communications system from a service access point, wherein the service access point receives the identification data of the subscriber over a first data transmission connection from a data transfer device;
a checker configured to check over a third data transmission connection from the mobile communications system over a data transfer connection whether the mobile subscriber identification data contains an access right to the service access point and, if a valid access right exists;
a generator configured to generate a password and transmit the password to a subscriber terminal corresponding to the identification data of the subscriber of the mobile communications system, wherein the passWord transmitted to the subscriber terminal is used by a data transfer device in connection with login to the service access point, and
a transmitter configured to transmit a second password from the service access point to the data transfer device over the first data transfer connection, wherein the data transfer device is configured to also use the second password in connection with login.

38. An apparatus, comprising:
a receiver configured to receive mobile subscriber identification data of a subscriber of a mobile communications system from a service access point;

a checker configured to check from the mobile communications system over a data transfer connection whether the mobile subscriber identification data contains an access right to the service access point and, if a valid access right exists;
a generator configured to generate a password and transmit the password to a subscriber terminal corresponding to the identification data of the subscriber of the mobile communications system, wherein the password transmitted to the subscriber terminal is used by a data transfer device in connection with login to the service access point; and
a transmitter configured to transmit a confirmation identifier via the service access point to the data transfer device and to transmit the same confirmation identifier to the subscriber terminal together with the password.

39. An apparatus, comprising:
a receiver configured to receive mobile subscriber identification data of a subscriber of a mobile communications system from a service access point;
a checker configured to check from the mobile communications system over a data transfer connection whether the mobile subscriber identification data contains an access right to the service access point and, if a valid access right exists;
a generator configured to generate a password and transmit the password to a subscriber terminal corresponding to the identification data of the subscriber of the mobile communications system, wherein the password transmitted to the subscriber terminal is used by a data transfer device in connection with login to the service access point; and
a transmitter configured to transmit a user identification to the subscriber terminal corresponding to the identification data of the subscriber of the mobile communications system, wherein the data, transfer device is configured to also use the user identification in connection with login to the service access point.

40. An apparatus, comprising:
a receiver configured to receive mobile subscriber identification data of a subscriber of a mobile communications system from a service access point;
a checker configured to check from the mobile communications system over a data transfer connection whether the mobile subscriber identification data contains an access right to the service access point and, if a valid access right exists;
a generator configured to generate a password and transmit the password to a subscriber terminal corresponding to the identification data of the subscriber of the mobile communications system, wherein the password transmitted to the subscriber terminal is used by a data transfer device in connection with login to the service access point; and
a transmitter configured to transmit a user identification via the service access point to the data transfer device, wherein the data transfer device is configured to use the user identification transmitted in connection with login to the service access point.

* * * * *